United States Patent [19]

Kieninger

[11] Patent Number: 4,627,771

[45] Date of Patent: Dec. 9, 1986

[54] MILLING-CUTTER

[76] Inventor: Walter Kieninger, An den Stegmatten 7, D-7630 Lahr 17 (Mietersheim), Fed. Rep. of Germany

[21] Appl. No.: 694,520

[22] PCT Filed: May 16, 1984

[86] PCT No.: PCT/EP84/00147

§ 371 Date: Jan. 16, 1985

§ 102(e) Date: Jan. 16, 1985

[87] PCT Pub. No.: WO84/04478

PCT Pub. Date: Nov. 22, 1984

[30] Foreign Application Priority Data

May 17, 1983 [DE] Fed. Rep. of Germany ....... 3317916

[51] Int. Cl.$^4$ .............................................. B26D 1/00
[52] U.S. Cl. ........................................ 407/39; 407/41
[58] Field of Search ................................. 407/37–39, 407/41

[56] References Cited

U.S. PATENT DOCUMENTS

| 1,468,774 | 9/1923 | Caldwell . | |
| 2,440,978 | 5/1948 | Schlenkert . | |
| 2,846,757 | 8/1958 | Klosterkemper . | |
| 3,121,939 | 2/1964 | Williams | 407/39 |
| 3,129,615 | 4/1964 | Lombardo | 407/39 |
| 3,363,299 | 1/1968 | Gowanlock | 407/39 |
| 4,470,731 | 9/1984 | Erkfritz | 407/38 |

FOREIGN PATENT DOCUMENTS

| 1260926 | 11/1962 | Fed. Rep. of Germany ........ 407/38 |
| 3036527 | 5/1982 | Fed. Rep. of Germany . |
| 3125185 | 1/1983 | Fed. Rep. of Germany . |
| 2162885 | 7/1973 | France . |
| 2165595 | 8/1973 | France . |
| 928294 | 6/1963 | United Kingdom . |

Primary Examiner—Leonidas Vlachos
Attorney, Agent, or Firm—Cohen, Pontani & Lieberman

[57] ABSTRACT

In a milling tool with a disc-shaped base member 1 having a central securement bore 2 and provided, in the region of its outer periphery, with equidistantly spaced retainer cutouts open towards the front face of the base member, for receiving and for retaining the respective cutting plate support 4, which is adapted and fixedly secured in the respective retainer cutout 3 for selective adjustment both in an axial as well as, independently therefrom, in a radial direction. Each support 4 carries a cutting plate 6 or 62 whose main plane is disposed generally radially. In order to enable the adjustability of each plate by pivoting same about an imaginary axis perpendicular to the central axis of the base member in addition to and independent of the adjustments in axial and radial directions, the cutter plate is arranged in a cutout 10 of a cutter plate spacer 11 which is complementary in shape with the shape of the plate, the spacer, in turn, being adapted for turning on the cutter plate support 4 about an imaginary axis generally perpendicular to a radial plane of coincidence of the central axis 5 of the base member, the spacer being adapted for becoming selectively secured relative to the cutting plate support 4. With advantage, the milling tool is so formed that each cutting plate support 4 is displacable and fixable in a generally radial direction on a respective support member 36 and that each support member 36 is guided and secured to the base member (1) for displacement and securement in a direction parallel to the central axis 5 of the base member 1, relatively to the same.

20 Claims, 9 Drawing Figures

MILLING-CUTTER

The invention relates to a milling tool with a disc-shaped base member and with a central securement bore and retainer cutouts for receiving and securing a respective cutting plate support, the cutouts being disposed in the region of the outer periphery and being equidistantly spaced from each other and being open towards the front face of the base member, wherein each cutting plate support is adjustable and fixable in the respective retainer cutout both in axial as well as, independently therefrom, in a radial direction and carrying each a cutting plate disposed with its main plane oriented generally radially.

A milling tool of the type mentioned at the outset is known from West German patent specification DE-OS 3125185, wherein each cutting plate support is adjustable by means of two adjustment wedge mechanisms in radial direction and, independent therefrom, in an axial direction. In this known milling tool, a respective cutting plate is secured to its cutting plate support and in a recess provided for the purpose, by means of a securement bolt. An adjustment of the cutting plate with respect to the positioning of its cutting edges during the rotation about an axis extending perpendicularly to the tool axis (or perpendicularly to the main axis of the cutter plate) is not possible in this known milling tool. Thus, an adjustment, of all cutting plates disposed about the periphery of the known milling tool such that their cutting edges would also extend at a uniform angle with respect to the axis of the milling tool is not possible.

From West German Patent Specification DE-OS No. 3036527, a milling tool is known wherein the radial adjustment of the cutting plate support is effected by two set screws engaging the support surfaces at two points. The screws extend radially and are disposed one after the other relative to the axial direction of the tool. They are devoid of a guiding and support by a radial surface which would extend perpendicularly to the axis of the tool. Since these two set screws must be actuated independent on each other and since a guide means of the cutting plate support along a plane perpendicular to the axis of the tool is not provided, an exclusively radially oriented adjustment of the cutting plate support without simultaneous tilting about an axis perpendicular to the axis of the tool is not additionally available. A radial displacement and adjustment of the cutting plate and a tilting displacement and adjustment of the plate independent on each other is not possible in the known milling tools due to the particular holding and adjustment mechanisms, unless one uses auxiliary control devices such as a transillumination apparatus, by means of which the adjustment motion during the actuation of the set screws can be controlled. It is an object of the invention to provide a milling tool of the type referred to at the outset, which would, on a simple structure, enable independent adjustments of the cutting plate in axial direction and in radial direction and independently therefrom would enable an inclination adjustment of the cutting plate about an axis extending perpendicularly to the axis of the tool, in a simple, quick, accurate and reliable way while reliably holding the cutting plate in the adjusted state.

According to the invention, the cutting plate is arranged in a recess of a cutting plate spacer having a shape complementary with the plate, that the cutting plate spacer is movable on the cutting plate support about an imaginary axis generally perpendicular to a radial plane of coincidence with the central axis of the base member and is arranged for fixed securement relative to the cutter plate support.

The inventive milling tool has substantial advantage over the known prior art. By the arrangement, according to the invention, of each cutter plate in a recess complementary in shape to the plate and arranged in the associated cutting plate spacer which itself is so arranged on the associated cutting plate support that it is movable about a plane generally perpendicular to the central axis of the base member and is adapted to be secured relative to the cutting plate support, it is achieved that each cutter plate support (and thus the cutter plate secured to same) is adjustable not only in radial direction and independently therefrom in axial direction, but also can be adjusted, independent on the aforesaid adjustment motions, by an adjustment movement of the cutting plate spacer such that the cutting edge of each plate extends at an angle relative to the central axis of the base member which exactly corresponds to the respective angle of the cutting edges of the remaining cutting plates of the milling tool, the angle corresponding to the prescribed or desired angle. In the present milling tool, therefore, a quick, reliable and exact adjustment of all cutting plates is enabled in a simple way. The inventive milling tool has a simple structure comprised of merely a few parts and is robust, precise and reliable both from the standpoint of its handling and in operation.

Many other features and advantages of the present invention will become apparent from the following detailed description of the invention referring to the accompanying drawings, wherein.

In FIGS. 1 to 5 a first embodiment of the milling tool is illustrated. The tool has a disc-shaped base member 1 with a centrally disposed mounting bore 2 and mounting cutouts 3 equidistantly spaced around the base member in the area of its outer periphery and opened towards the front face of the base member. Only one mounting recess is shown in the figures. Each cutout is provided to receive and hold one cutting plate support. Each plate support is mounted in the associated cutout so that it can be adjusted both in axial direction, parallel to the central axis of the base body 1 and also, independently therefrom, in a radial direction relative to the central axis. The support, of course can then be fixed in its adjusted position. The adjustment procedure will be explained below in more detail.

Each cutting plate support 4 holds one cutting plate 6 whose principal plane is disposed essentially radially. In the embodiment shown in FIGS. 1–5 each cutting plate 6 is provided as a so-called wedge block. The plate has a conical hole 7 which is marked with dotted lines in FIGS. 1 and 3. The hole is adapted to receive a screw 8 whose conical head matches the wall of the hole and which can be threaded into the tapped hole 9 in the cutting plate support 4 to fasten the cutting plate 6 thereto. The cutting plate is located in a cutout 10 of a cutting plate spacer 11, the shape of the cutout matching the shape of the plate. The spacer 11 is mounted on the cutting plate support 4 rotatably about an imaginary axis disposed essentially perpendicularly to a plane of coincidence with a central axis 5 of the base member 1 and can be locked in position relative to the cutting plate support 4.

The cutting plate spacer 11 is made in the form of a plate whose edge along a section 12 of its perimeter has a circular shape and has therein a peripheral surface 13 defining a segment of a frustoconical surface. The cutting plate support 4 has a complementary cutout 14 adapted to receive and guide the cutting plates spacer 11. The cutout 14 comprises a base surface 15 adapted to engage the base surface 16 of the cutting plate spacer, the surface 15 being disposed essentially in a radial plane of coincidence with the central axis 5; the cutout also comprises a partially limited peripheral surface 17 which constitutes a segment of a frustoconical surface and in complementary in shape to the conical peripheral surface 13 of the spacer 11. The cutout 14 is shown outwards in a radial direction and open towards the front face of the base member 1.

Figure 2:
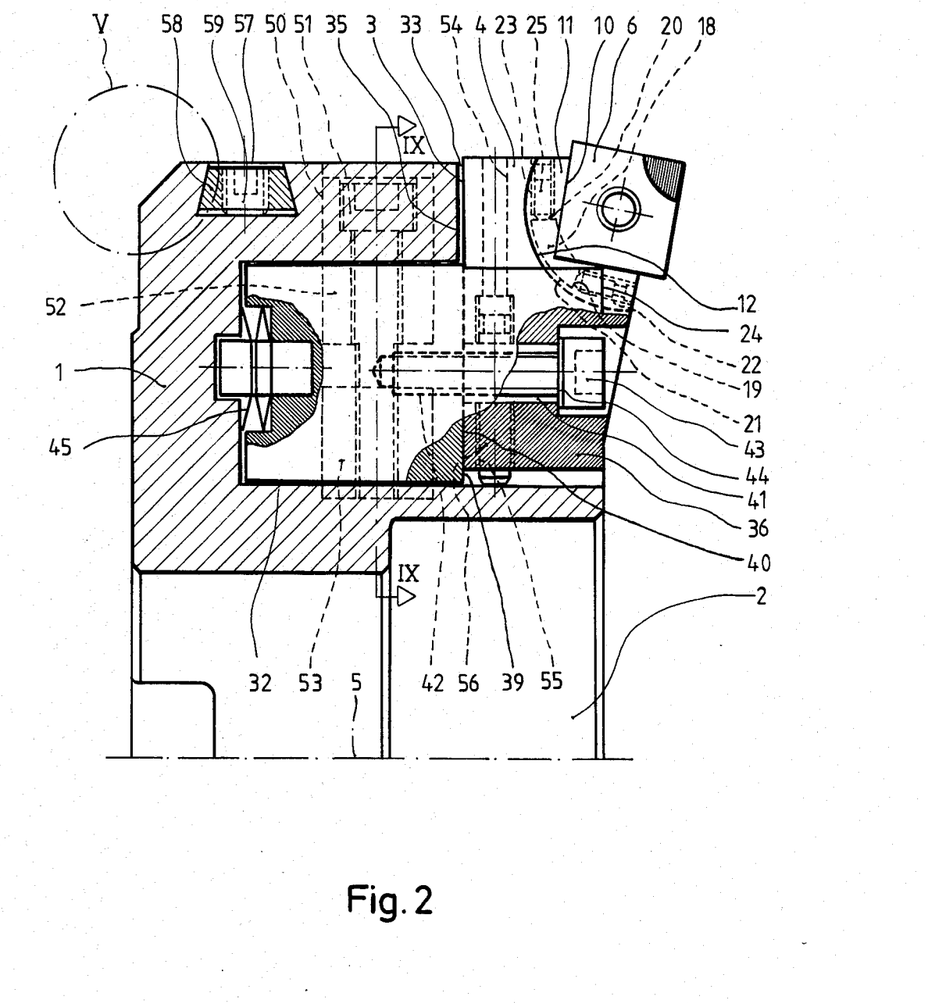
FIG. 2 is section II—II of FIG. 1.

The spacer 11 is provided at its base surface 16 with a protrusion 18 projecting perpendicularly to the base surface. The protrusion has the form of a wall section extending, as a circular arc, concentrically to the conical peripheral surface 17 and having two end surfaces 19, 20 extending radially to the circular arc. The protrusion 18 with its end walls is illustrated in FIG. 2 with dotted lines. When the base surface 16 of the spacer 11 is engaged with the base surface 15 of the receiving cup 14 of the cutting plate support 4 and the conical peripheral surface 17 of the spacer 11 is engaged with a conical peripheral surface 13 of the receiving cup 14, the protrusion 18 is disposed in an arcuate cutout 21 and a base surface 15 of the receiving cutout 14 made in the cutting plate support 4, said arcuate 21 being concentric with the conical peripheral surface 13. The cutout 21 is marked with dotted lines in FIG. 2. At each end of the arcuate cutout 21 a threaded bore 22 or 23 is provided, each bore extending in a direction towards a respective outer surface of the cutting plate support 4 at its front face or a radially outward surface thereof. A set screw 24 or 25, drivable from the exterior is threaded into each hole 22 or 23 in such a way that the inner end of each said screw can be brought into engagement with the corresponding facing hand surface 19 or 20 of the protrusion 18.

The receiving cutout 14 of the support 4 is open on its side opposite to its base surface 15. The height of the conical peripheral surface 13 of the receiving cutout 14 corresponds to the thickness of the plate-shaped cutting plate spacer 11.

Figure 1:
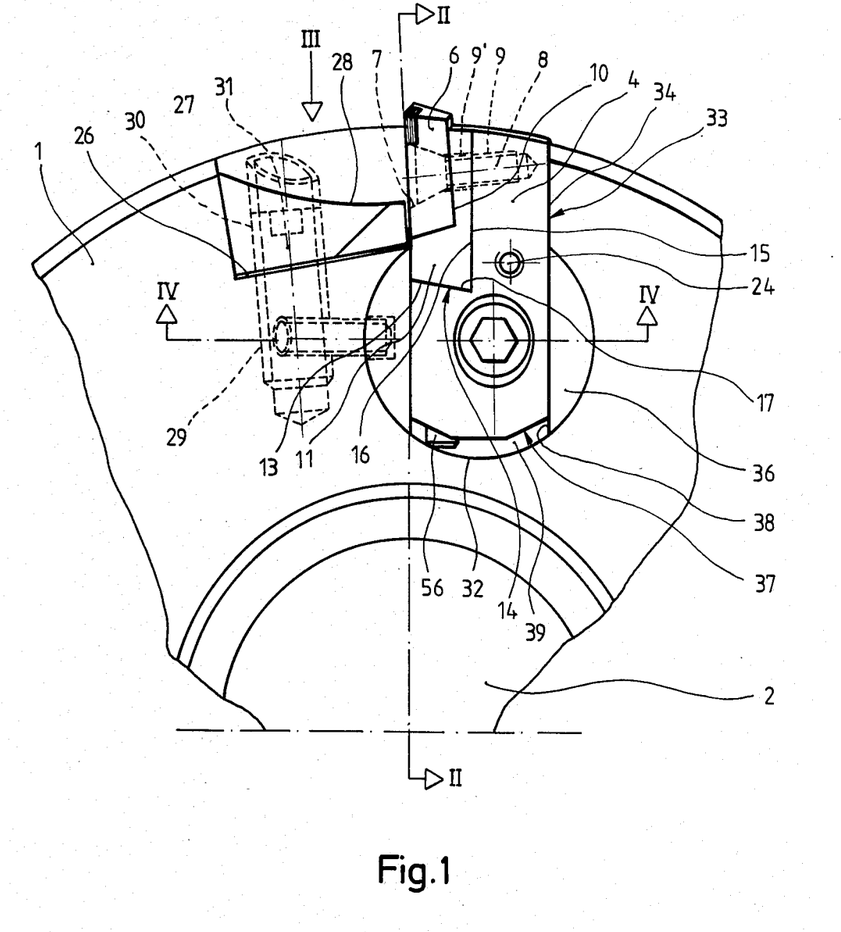
FIG. 1 is a partial front view of a milling tool according to a first exemplary embodiment of the present invention.
Figure 3:
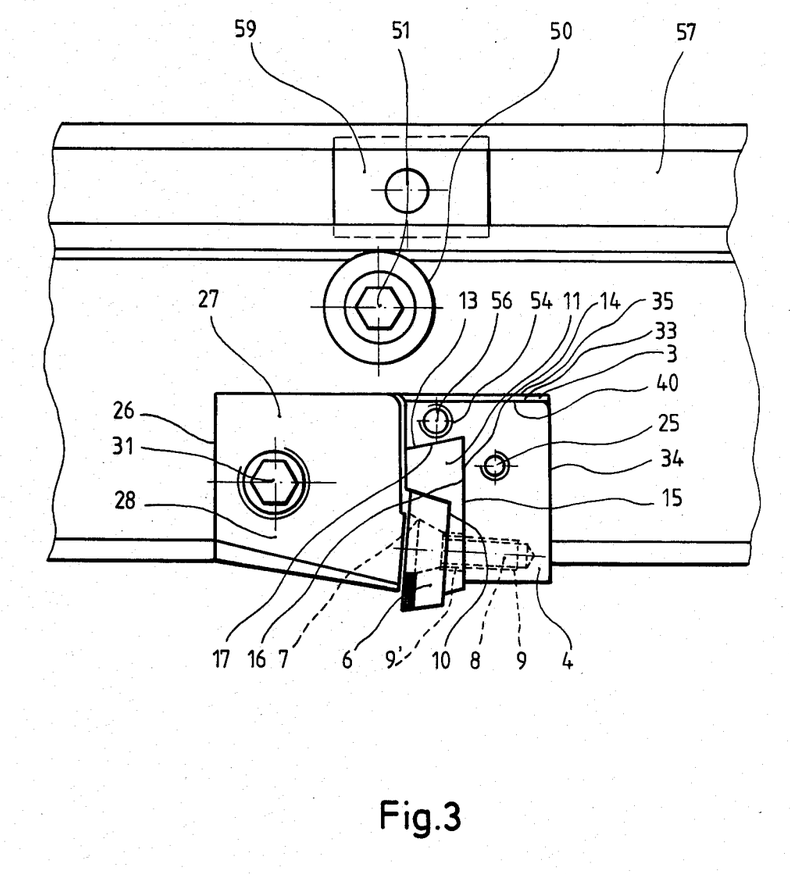
FIG. 3 is a top view in the direction of the arrow III of FIG. 1

As can be seen from FIGS. 1 and 3, the cutout 10 of the cutting plate spacer 11 is so disposed that it provides a specific orientation of the cutting plate 6 mounted therein, and namely, that the principal plane of the plate containing the cutting edges is inclined, or obliquely disposed, both in axial direction and also in radial direction as seen relative to the central axis 5 of the base body 1. Correspondingly, the tapped hole 9 and the cutting plate support 4 adapted to receive a tightening screw 8 holding the cutting plate 6 is also non-perpendicular to a radial plane including the central axis 5 of the base body but it is perpendicular to the principal plane of the cutting plate 6. Furthermore, it can be seen in FIG. 1 and FIG. 3 that in this embodiment the cutting plate spacer 11 has also a cutout 9' which is in alignment with tapped hole 9 in the cutting plate support 4 through which the fastening screw 8 can be conveniently reached.

At the outer periphery of the base member 1 a cutout 26 is provided beside each mounting cutout 3 made for a cutting plate support 4, the cutout 26 being opened towards the outer periphery, the front face of the base member 1 and towards the cutting surface of the respective cutting plate as well as towards the cutting plate spacer 11 which supports the above elements. The cutout 26 is adapted to receive a wedge 27. The wedge 27 of complementary shape and matching the contact surface of the cutout 26 is fixedly secured in the cutout 26. The surface 28 of each wedge 27 directed towards the outer periphery is shaped as a concave chip guide surface.

To secure the wedge 27 in the cutout 26 of the base member 1 a bore 29 is provided at the bottom of the cutout (FIG. 1). A fastening screw 31 passes through the hole 30 in the wedge 27 and is threaded into the bore 29 which is in alignment with the hole 30. In the illustrated embodiment the hole 30 and the wedge 27 is also adaptable with the thread direction opposite to that of the bore 29 made in the base body. A fastening screw 21 which constitutes a so-called differential screw with two threads of opposite direction, is threaded into the bores 29 or 30. The turning of the screw 31, the wedge 27 will be moved towards or away from the bottom of the cutout 26, depending on the direction of rotation of the screw 31.

Each mounting cutout 3 of the base member 1 is provided with a forwardly open blind bore 32 whose axis is generally perpendicular to the front face of the base member. The diameter of the cutout is uniform along the axis. The cutout further includes a region having the shape of a shaft 33 extending over the front part of the depth of the bore 32 back and from the upper region of the bore 32 outwards up to the outer periphery of the cutout (FIGS. 1 to 3). Each blind hole 32 is formed as a cylindrical cutout. The shaft 33 above the blind hole 32 forms a side wall 34 which is parallel to an imaginary radial plane coinciding with the central axis 5 of the base body (FIGS. 1 and 3) and a rear wall 35 disposed at a right angle to the side wall 34 (FIGS. 2 and 3). The shaft 33 is open outwards towards the cutout 26 and the base body 1 to receive the wedge 27.

A cylindrical supporting member or body 36 is mounted in a cylindrical blind hole 32. The diameter of the body 36 which is slidably movable axially and can be secured in position corresponds to the diameter of the blind hole 32. The length of the supporting body 36 is approximately equal to the depth of the hole 32. The supporting body 36 has a channel-like recess 37 in its front part, the recess being opened forwardly (FIG. 1) and having parallel side walls. The width of the recess corresponds in size to the opening of the shaft-like area 33 of the mounting cutout 3.

The side wall 38 of the recess 37 is in alignment with the side wall 34 of the shaft 33. The channel-like recess 37 has supporting surface 39 on its part remote from the front face of the base member, this supporting surface being disposed perpendicularly to the central axis 5 of the base body 1. The cutting plate support 4 forms a body with two parallel side surfaces whose spacing matches the distance between the side walls of the shaft area 33 and also corresponds to the side of the channel-like recess 37, and with a rear counter surface 40 in its inner area, the surface 40 being parallel to the supporting surface 39 of the channel-like recess 37.

The cutting plate support 4 is mounted slidably in the channel-like recess 37 and can be secured in position to its supporting surface 39. The cutting plate support 4 has a cutout 41 extending from its front face to its rear contact surface. In the associated supporting body 36 a bore 42 is provided extending from the supporting surface 39 of the channel-like recess 37. For fastening the cutting plate support 4 to the supporting body 36, a cap screw 43 is provided which extends through the cutout 41 in the cutting plate support 4 and is threaded into the bore 42 of the supporting body 36. As can be seen from FIG. 2, the width of the cutout 41, especially in radial direction, is bigger than the diameter of the threaded stem of the cap screw 43. A cup spring 44 is disposed between a side of the screw thread facing the cutting plate carrier 4 and the outer periphery of the cutout 41.

Figure 4:
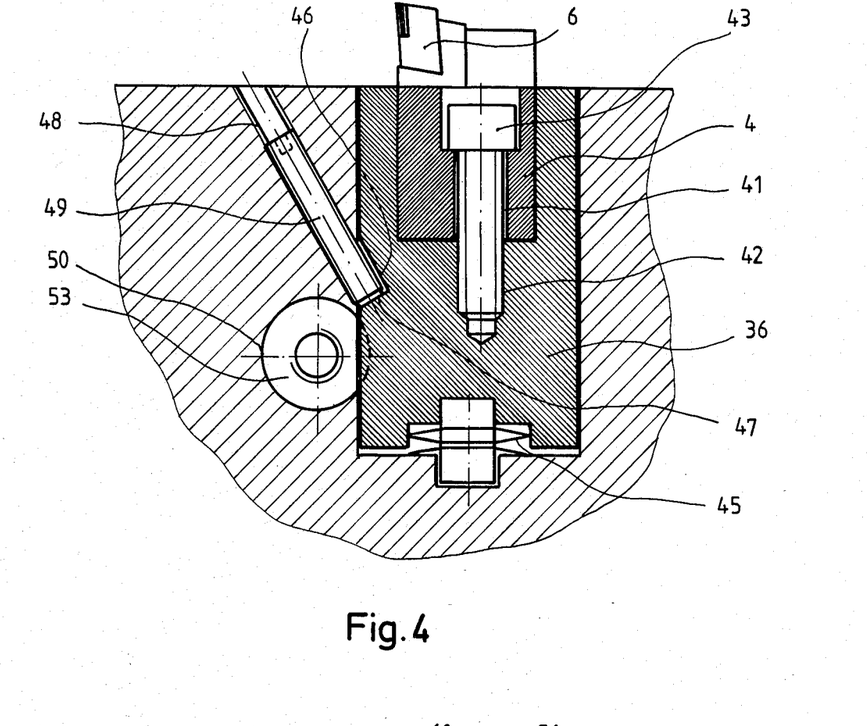
FIG. 4 is section IV—IV of FIG. 1.

A compression spring means is provided between the bottom of the blind hole 32 and the inner end of the supporting body 36. The compression spring means is a disc spring stack 45 which is arranged on a pin located in a cutout at the inner end of the supporting body 36 (FIG. 2). On the exterior of the supporting body 36 an indentation 46 is provided which has its contact surface 47 sloped outwardly (FIG. 4). In the vicinity of each blind hole 32 made in the base body 1 a tapped-through hole 48 is provided which extends from the front face of the base body inwardly at an angle to the axis of the blind hole 32 up to the inner wall of the blind hole 32. The inner end of the bore 48 is located upwards to the indentation 46 made in the supporting body 36. A set screw 49, drivable from the exterior is threaded into the bore 48 so that its front end can be brought into engagement with the contact surface 47 of the indentation 46 (FIG. 4).

Figure 9:
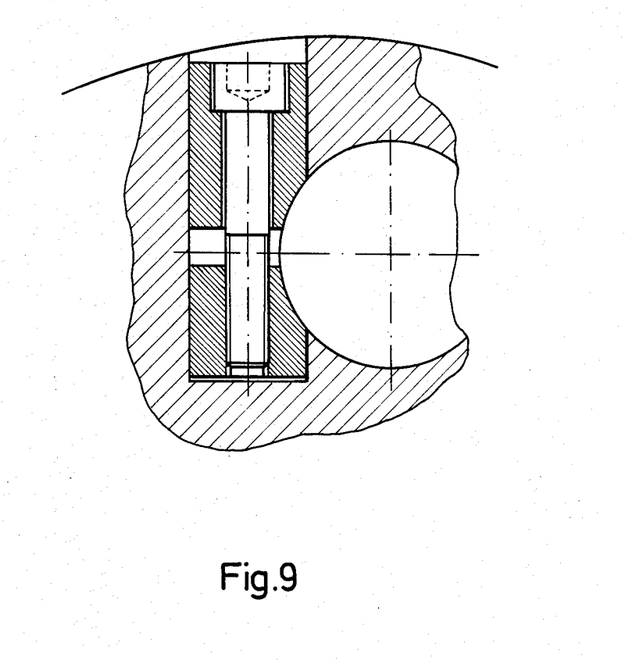
FIG. 9 is section IX—IX of FIG. 2 or FIG. 7.

To secure the cylindrical supporting body 36 in its corresponding blind hole 32 made in the base member 1 a blind hole 50 is provided in the area of the mounting cutout 3, the hole 50 extending inwardly, essentially radially from the outer periphery behind the supporting surface 39 of the channel recess 37. The cross-section of the blind hole 50 is constant along its axis which extends at a right angle to the axis of the blind hole 32 which receives the supporting body 36 and is at a lateral distance from the other axis (FIGS. 2, 3, 4, and 5). In the blind hole 50 there is positioned a differential screw 51 which has upon its stem two threaded areas of opposite thread direction, two clamping members 52 and 53 being correspondingly threaded with their inner thread onto the threads of the stem and being axially spaced from one another. The diameter of both clamps matches the diameter of the blind hole 50. The differential screw 51 is so arranged that when it is tightened, the supporting body 36 is clamped with its external surface between the facing ends of the clamps 52 and 53. The blind hole 50 is of cylindrical shape and the clamps are cylindrical portions, their diameter corresponding to the diameter of the blind hole 50. The facing surfaces of the clamps 52 and 53 are formed as cutting surfaces adapted to match the shape of a shell of the supporting body 36 (FIG. 9).

In the body of the cutting plate support 4 a through-passing bore 54 with inner thread 55 is provided which extends from its radial outer surface to its inner radial surface essentially perpendicularly to the axis of the cutout 41 made for the cap screw 43 and at a lateral distance from the cutout 41. A set screw, drivable from the exterior is threaded into the bore 34 so that its inner end can be brought into engagement with an inner radial area of the inner wall of the blind hole 32 for the supporting body 36 (FIGS. 1, 2 and 3).

In the base body 1 of the milling tool a groove 57 is provided around the circumference, the side walls thereof being sloped in one direction so that the width of the groove increases towards its bottom. In the groove a balancing stone 58 is positioned, its side surfaces being complementary to the side walls of the groove 57. The balancing stone 58 can be displaced in the groove 57 along the circumference of the base body 1. A burrow is provided in the balancing stone, passing therethrough and a screw 59 is threaded into the bore. The inner end of the screw 59 can be brought into engagement with the bottom of the screw 57. The balancing stone 58 can be trapped fixedly in any place in the groove 57 along its perimeter by tightening the screw 59 (FIGS. 2 and 5).

Figure 5:
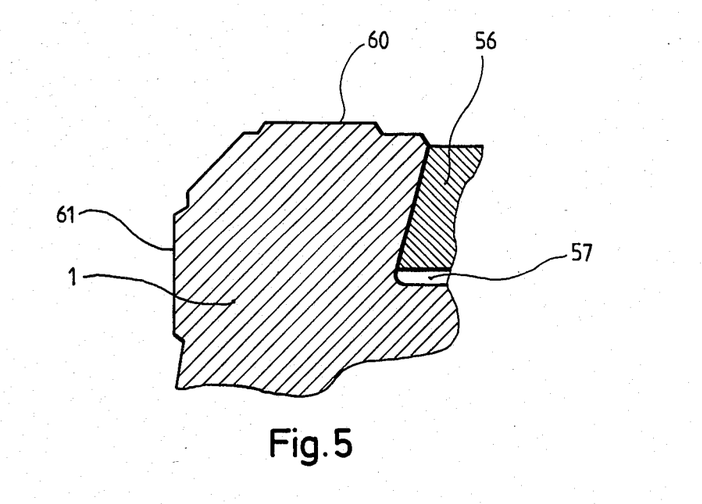
FIG. 5 is detail V of FIG. 2, on enlarged scale

As can be seen from FIG. 5, polished annular surfaces 60 or 61 are provided on the external periphery of the base body 1 in its rear area and on the rear face thereof. By means of the surfaces 60, 61 the rotary motion or the planning action of the milling tool can be controlled.

The possibilities of adjustment of the cutting plate of the tool will be explained below in conjunction with FIGS. 1 to 5.

In order to adjust all cutting plates 6 of the milling tool, each cutting plate is to be, first of all, positioned in the cutout 10 of the corresponding cutting plate spacer 11, the cutting edge of the cutting plate being oriented in the cutting direction. The fastening screw 8 is put through the hole 7 and a cutout 9' and a spacer 11 and threaded into the bore line of the cutting plate support 4. The fastening screw 8 should not, however, be tightened fully so the cutting plate spacer 11 can be turned relative to the cutting plate support 4 by adjusting the said screws 24 and 25, wherein the arcuate peripheral surface 17 of the spacer 11 slides along this arcuate peripheral surface 13 of the cutout 10 made in the cutting plate support 4. By such turning, the cutting plate spacer 11 with its cutting plate 6 is set in such a position relative to the cutting plate support 4, in which the radial outer cutting edges and the cutting edges extending along the front face of the base body 1 are placed in the pre-set or desired angular direction towards a central axis 5 of the base body. As soon as the desired angular position of the cutting plate is obtained the plate is fixedly secured by bringing both set screws 24 and 25 into engagement with the corresponding surfaces 19 or 20 of the protrusion 18 of the spacer 11 and then by threading the fastening screw into the bore 9 of the cutting plate support 4 until the cutting plate 6 and the spacer 11 are clamped tightly together with a cutting plate support 4 and secured thereto. Subsequently, the radial position of the cutting plate can be set. For that purpose, the capped screw 43 is loosened to such a degree that the cutting plate support 4 can be pushed radially outwards over the inner edge of the cutting plate support by further removing (threading of) the head screw 56, or it can be brought into the desired radial position relative to the central axis 5 of the body 1 through farther driving the said screw into the cutting plate support 4 and radial shifting the support 4 by applying thereto an external pressure.

As soon as the radial position is reached, the cutting plate support 4 is capped with a supporting body 36 by re-tightening the cap screw 43.

Subsequently, the axial adjustment of the cutting plate can be made. For that purpose, the differential screw 51 is turned from outside so that the chips 52 and 53 separate or move in opposite directions and thus the supporting body 36 and the blind hole 32 is released. By turning the said screw 49 two options are available, either to push the supporting body 36 against the compression force of the disc spring stack 45 inwardly radially into the blind hole or, by utilizing the thrust of the disc springs, to displace the body 36 further outwardly in the blind hole 32. As soon as a desired axial position of the cutting plate 6 is reached, the differential screw 51 can be tightened again so that the clamps 52 and 53 are moved towards each other and brought into clamping engagement with the shell of the supporting body 36 whereby the body 36 is fixedly secured in the blind hole 32. In the milling tool shown in FIGS. 1 to 5 each cutting plate can be independently adjusted and fixed in three directions respectively, and namely, because the cutting plate spacer 11 housing the cutting plate 6 is rotatable in relation to the cutting plate support 4 which, in turn, extends in essentially radial direction relative to the supporting body 36 and is fastened thereto, and the supporting body in its turn is movable parallel to the central axis 5 of the base body 1 and can be fixed thereto.

It is to be mentioned, moreover, that the cutting plate spacer 11 can be turned relative to the cutting plate support by means of said screws 24 and 25 even when the fastening screw 8 is already tightened. It is possible to adjust to axial position of the supporting body 36 and the cutting blade 6 with the accuracy to one-thousandth of a millimeter.

In the case of the milling tool according to FIGS. 1 to 5 the filling wedge 27 can be positioned in the cutout 26 and fastened thereto by means of the screw 31. In this embodiment, the wall of the filling element adjacent to the cutting plate does not come into contact with the cutting plate. The thickness of the cutting plate 6, for instance can be slightly smaller than the depth of the cutout 10 and a cutting plate spacer 11 and/or the wedge has such dimensions that the wedge wall adjacent to the cutting plate does not touch the latter. A concave outer surface of the filling element 27 serves as a chip guiding or removal space which enables the chips to be continually removed from the milling tool without any problems.

After the adjustment of all cutting plates of the milling tool one must check for a planar or rotary run of the tool. This is done by means of the annular surfaces 60 and 61 on which suitable measuring instruments can be applied when a milling tool is turned. After such control the milling tool can be precisely balanced by proper positioning of the balancing stones 58 on the perimeter of the tool.

Figure 6:
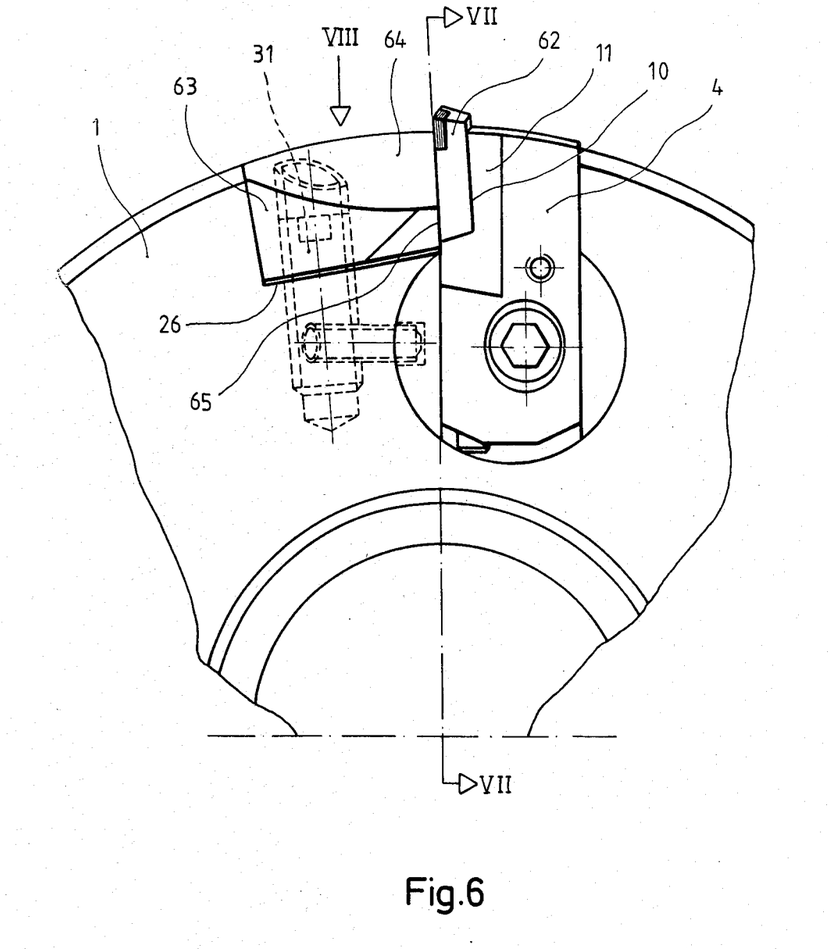
FIG. 6 is a partial front view of a second exemplary embodiment of a milling tool according to the invention.
Figure 7:
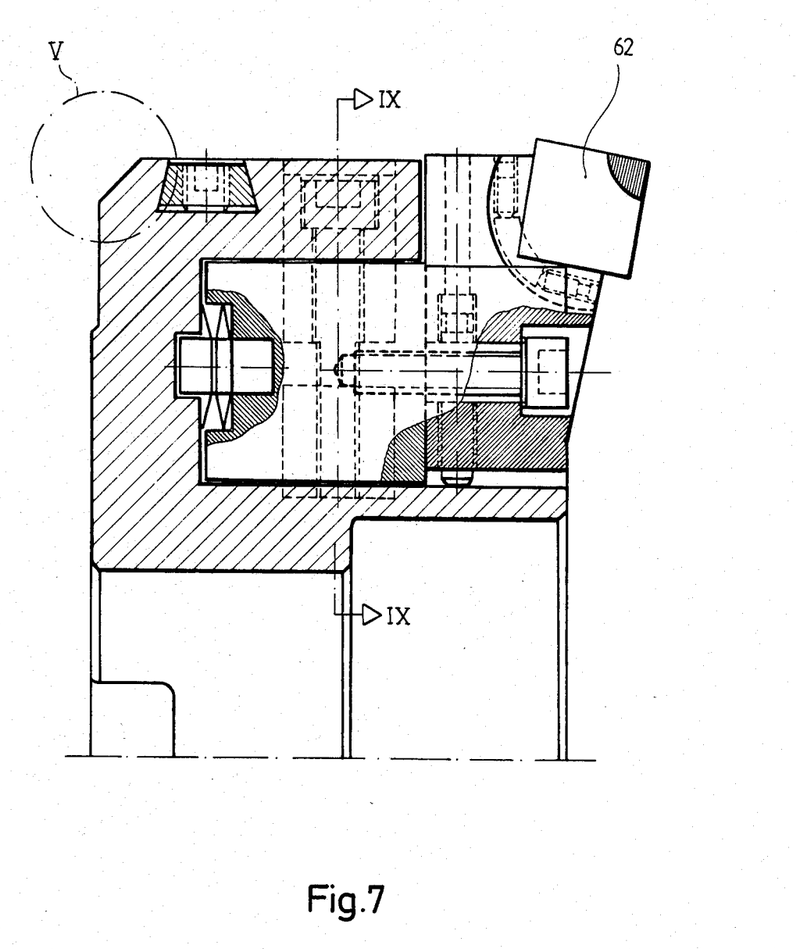
FIG. 7 is section VII—VII of FIG. 6.
Figure 8:
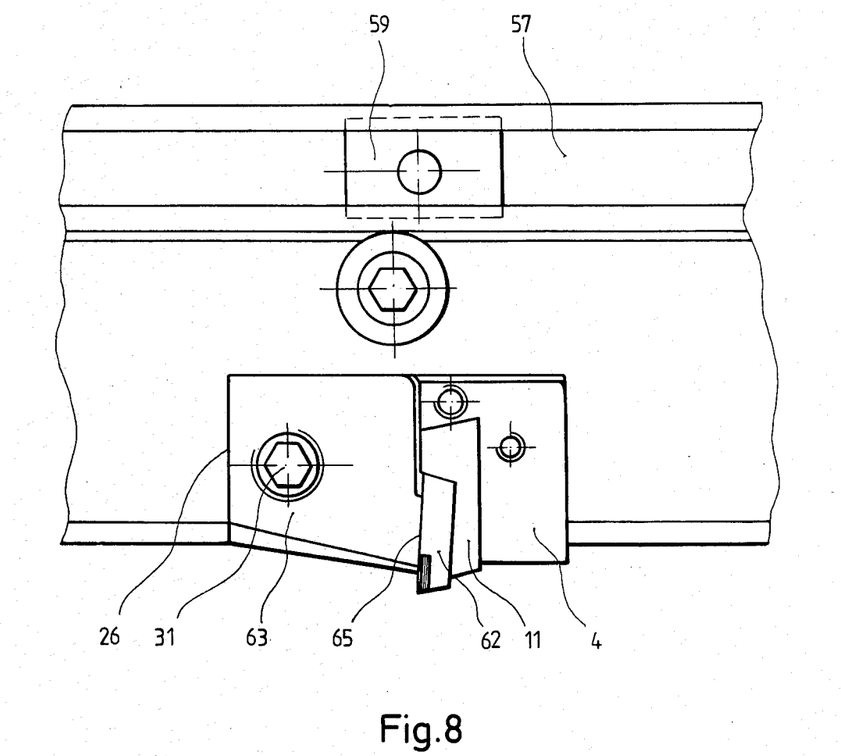
FIG. 8 is a top view in the direction of the arrow VIII of FIG. 6.

A second embodiment of the milling tool of this invention is illustrated in FIGS. 6 to 8. In this embodiment cutting plates without mounting holes are used and therefore the plates must be secured in a working position by tight clamping. The structure of the milling tool of the second embodiment corresponds largely with that of the first embodiment as described in conjunction with FIGS. 1 to 5 as will be explained below with reference to the description of the first embodiment, to what extent similar elements are used in both embodiments. Also, in the description of the second embodiment, the same reference numerals will be used to indicate corresponding parts. FIGS. 4 and 5 apply not only to the first embodiment but also to the second one.

The only difference in the design of the two embodiments of the milling tool appears in the way of fastening the cutting plate. In the second embodiment, the cutting plate 62 is positioned in the cutout 10 of the cutting plate spacer 11, the shape of the cutout corresponding with the shape of the plate 62, and is not fastened to the cutting plate support 4 with a fastening screw. In the second embodiment, a wedge 63 is provided in the cutouts 26 which is made in the base body 1 and adjacent to the cutting plate, the wedge being complementary shaped to the contact surfaces of the cutout 26. The wedge 63 can be connected with the base body 1 by means of a screw 31 as explained in the case of the first embodiment. The surface 64 of the wedge 63 facing the outer periphery is formed as a concave chip spaced similarly to the first embodiment.

Each wedge 63 has a clamping surface 65 on its side facing the respective cutting plate 62. Each wedge 63 is disposed in its corresponding cutout movable radially inwards in such a direction that it can exert a pressure onto the cutting surface of the cutting plate 62. Such an inward motion on the clamping surface is obtained by the tightening of the screw 31 made as a differential screw. In a clamped position, in which the clamping surface 65 of the wedge 63 is tightened to and rested against the corresponding cutting surface of the cutting plate 62, the wedge is secured in position due to the suitable tightening of the differential screw 31 (FIGS. 6 and 8). In this embodiment, the depth of the cutout 10 and the cutting plate spacer can be slightly smaller than the thickness of the cutting plate 62 so that the latter projects slightly over the cutting plate spacer and thus comes into contact with a clamping surface 65, whereby the clamping surface 65 does not contact the cutting plate spacer.

Thus, in the second embodiment the filling element 63 performs a double function, namely as a chip removal element and as a fastening element for securing the cutting blade in its working position.

The adjustment of the cutting plate 62 in the milling tool of the second embodiment is performed similarly as the above described adjustment of the cutting plate 6 in the first embodiment. Nevertheless, in case of doubt, the preferred practise is to make the final fastening of the cutting plate 62 by tightening the wedge 63 only after the axial and radial positioning is finished.

In both embodiments of the milling tool according to the FIGS. 1–5 or 6–8 it is possible to remove the cutting plate spacers from the associated cutting plate supports and to exchange them for other spacers which fit in the respective receiving cutouts 14 of the cutting plate supports. In this way it is possible to equip the milling tool, as desired, with different cutting plates, wherein in each case the cutting plate spacers, whose cutouts 10 are of a shape conforming to the shape of the respective cutting plates to be used, are mounted in the cutting plates supports. Moreover, the cutouts 10 in the cutting plate spacers not only can have the form corresponding to that of the cutting plates to be used, but also can be positioned with respect to the central axis of the base body of the tool in such a fashion that, due to the resulting positioning of the cutting plate a positive or negative cutting angle is obtained, as required.

In a milling tool of this invention cutting plates of various materials can be utilized, for instance, the plates of HSS (high strength steel) hard alloys, plates with diamond inserts, with CBN inserts or ceramic cutting plates. The only requirement is that the cutting plates be of a shape conforming to the shape of the cutouts 10 of the cutting plate spacers 11.

The invention is not limited to the present embodiments. For instance, the axially adjustable supporting body can be also made as a body of a cross-section can be positioned and secured in a blind hole of the corresponding rectangular cross-section.

The features of the invention as disclosed in the specification and in the drawings can be used in a number of combinations within the scope of this invention.

The embodiments of the invention in which an exclusive property or privilege is claimed are defined as follows:

1. A milling tool, comprising:
    a disc-shaped base member (1) having a central securement bore (2) and a plurality of substantially equidistantly spaced retainer cutouts (3) disposed about the perphery of said base member and open towards a front face of said base member (1);
    a plurality of cutting plate supports (4), each said support (4) being disposed in and including means to adjustably secure said supports to one of said plural retainer cutouts (3) so that said support (4) is independently movable and fixable in an axial and in a radial direction with respect to said disc-shaped base member (1);
    a plurality of cutting plates (6), each said cutting plate (6) being carried by one of said supports (4) so that its main plane is oriented in a generally radial direction;
    a plurality of cutting plate spacers (11), each said spacer (11) having a cutout (10) and each said cutting plate (6) being located in one of said cutting plate spacer cutouts (10); each said cutting plate spacer cutout (10) substantially matching the shape of the cutting plate (6) located therein; and
    a plurality of first adjustable securement means, each mounting one of said cutting plate spacers (11) to a respective one of said cutting plate supports (4) so that the cutting plate spacer (11) is independently rotatable about an axis defined substantially perpendicular to a radial plane containing a central axis (5) of said base member (1) and so that said cutting plate spacer (10) is independently positionally fixable relative to said respective cutting plate support (4) by said first adjustable securement means.

2. A milling tool according to claim 1 wherein said means to adjustably secure said supports includes a plurality of supporting bodies (36), a plurality of second adjustable securement means, and a plurality of third adjustable securement means, each of said cutting plate supports (4) being mounted on a respective one of said supporting bodies (36) by one of said second adjustable securement means so that said cutting plate support (4) is independently movable in a radial direction and independently positionally fixable with respect to said supporting body (36), and each of said supporting bodies (36) being mounted on said base member (1) by one of said third adjustment securement means so that said supporting body (36) is independently movable in an axial direction and independently positionally fixable with respect to said base member (1).

3. A milling tool according to claim 1, each of said cutting plate spacers (11) including an edge (12) having a circular peripheral portion defining a segment of a frustoconical surface (13) and a base surface (16), and each said cutting plate support (4) having a cutting plate support cutout (14) comprising a lateral surface (17) which forms a segment of a frustoconical surface complementary in shape to the frustoconical surface segment (13) of said cutting plate spacer (11) and a base surface (15) adapted for receiving said base surface (16) of said cutting plate spacer (11), said cutting plate support cutout (14) being open radially outward and toward said front face of the base member.

4. A milling tool according to claim 3, each said first adjustable securement means comprising:
    a protrusion (18) on and projecting at right angles from said base surface (16) of one of said cutting plate spacers (11);
    an arcuate cutout (21) defined in said base surface (15) of each cutting plate support cutout (14);
    said protrusion (18) being so arranged that on engagement of the base surface (16) of the cutting plate spacer (11) with the base surface (15) of the cutting plate support cutout (14), and of the frustoconical surface segment (13) with the lateral surface (17), the protrusion (18) is disposed in said arcuate cutout (21);
    said arcuate cutout (21) being concentric with said frustonical surface segment (13), and having at each end a first bore (22 or 23), each said first bore extending in a direction toward a respective outer surface of the respective cutting plate support (4); and
    a first set screw (24 or 25) drivable from the exterior being threaded into each first bore (22 or 23) such that the inner end of said screw is movable into independently positionally fixing engagement with an associated end surface (19 or 20) of said protrusion (18).

5. A milling tool according to claim 3, said cutting plate support cutout (14) being open on the side opposite to its base surface (15), and the height of said lateral surface (17) of the cutout (14) corresponds to the thickness of the cutting plate spacer (11).

6. A milling tool according to claim 5, further comprising a peripheral cutout (26) defined beside each retainer cutout (3) at the outer perimeter of the base member (1), the peripheral cutout (26) being open toward the outer perimeter as well as to the front face of the base member (1) and to the cutting surface of the respective cutting plate (6 or 62) and also toward the cutting plate spacer (11); and a wedge (27 or 63) having a shape and surfaces complementary to the cutout (26), said wedge being adapted for insertion into and fixing in the cutout (26).

7. A milling tool according to claim 6 wherein the peripherally outer surface (28 or 64) of each wedge (27,63) is concave and thereby forms a chip guide space.

8. A milling tool according to claim 6, further comprising at least one first threaded hole (29) provided at the bottom of each peripheral cutout (26) and adapted to secure a respective wedge (27,63) therein; and a differential fastening screw (31) for each said wedge, said screw (31) extending through a first tapped hole (30) in the wedge (27,63), and being screwed into the first threaded hole (29) which is aligned with the first tapped hole (30).

9. A milling tool according to claim 6, each wedge (63) having a clamping surface (65) on its side facing the respective cutting plate (62) and being disposed in said peripheral cutout (26) for radially inward movement in such direction that the clamping surface (65) can exert a pressure onto the cutting surface of the cutting plate (62) and thereby tightly secure said wedge in a position in which the clamping surface (65) is adjacent to the cutting surface of the cutting plate (62).

10. A milling tool according to claim 5, each first adjustable securement means further comprising a fastening screw (8), a mounting hole (7) in said cutting plate (6), a second bore (9') in said cutting plate spacer (11) and a second threaded hole (9) in said cutting plate support (4), the second bore and the second hole being disposed co-axially in essentially concentric relation to the frustoconical surface (13) of the cutting plate spacer (11) for receiving said fastening screw (8), and said cutting plate mounting hole (7) receiving said screw (8) for fastening said cutting plate (6) to the cutting plate support (4).

11. A milling tool according to claim 1, wherein said means to adjustably secure said supports includes a first blind hole (32) in each retainer cutout (3) and open toward the front face of the base member (1), the axis of the first blind hole being substantially perpendicular to the front face of the base member (1), said first blind hole (32) having a constant diameter along its axis and a shaft-shaped area (33) extending backwards from the front face of the base member through the front part of the cavity of the first blind hole (32) and outward from the upper area of the first blind hole (32) to the outer periphery of the base member; and a supporting body (36) mounted in said first blind hole, said supporting body having a shape matching the interior of said first blind hole and being adjustable axially and lockable in position; said supporting body (36) having a length substantially corresponding to the depth of the first blind hole and having on its front part a channel-like recess (37) with a supporting surface (39) extending perpendicular to the central axis (5) of the base member (1); and said cutting plate support (4) having a side surface parallel to a side wall (34) of the shaft-shaped area of said first blind hole (32) and a rear contact surface (40) extending parallel to the supporting surface (39) of the channel-like recess (37) of said supporting body, the cutting plate support being slidably disposed in the channel-like recess (37) and being adapted to be secured in position to its supporting surface (39).

12. A milling tool according to claim 11, further comprising compression spring means (45) disposed between an end wall of each first blind hole (32) and the inner end of the corresopnding supporting body (36); an identation (46) defined on the shell of the supporting body (36) and having an outwardly sloped contact surface (47); a threaded bore (48) defined in the base member (1) next to each first blind hole (32) and extending from the front face of the base member (1) inwardly at an angle to the axis of the first blind hole and having an inner end which faces the indentation (46) in the supporting body (36); and a second exteriorly-drivable set screw (49) threaded into said bore (48), the front end of the screw being adapted to be brought into engagement with the contact surface (47) of the indentation (46).

13. A milling tool according to claim 12, wherein said compression spring means is a disc spring stack (45).

14. A milling tool according to claim 12, wherein each said first blind hole (32) is formed as a cylindrical cutout and its corresponding supporting body (36) is of cylindrical form and has a diameter matching the diameter of the first blind hole (32).

15. A milling tool according claim 11, further comprising a second blind hole (50) defined in the area of each retainer cutout (3) and extending essentially radially inward from the external perimeter of the base member (1) behind the supporting surface (39) of the channel-like recess (37) for enabling fastening of said supporting body (36) in the respective first blind hole (32) in the base member (1), the second blind hole (50) having a constant diameter along its axis which is disposed at a right angle to the axis of the first blind hole (32) containing the supporting body (36) and which axis is distanced laterally from the axis of said first blind hole; a differential screw (51) in said second blind hole and having on its stem two threaded areas of opposite thread direction; and two clamps (52,53) threaded correspondingly onto said two threaded areas facing each other with their inner threads spaced axially from each other, wherein the shape of each said clamps (52,53) corresponds to the cross-sectional shape of a segment of the second blind hole (50), said screw (51) being so positioned that when it is tightened, the casing of the supporting body (36) is clamped between the surface ends of the facing clamps (52,53).

16. A milling tool according to claim 15, wherein the second blind hole (50) is of cylindrical form and the clamps (52,53) are cylindrical portions whose diameters correspond to the diameter of the second blind hole (50).

17. A milling took according to claim 15, wherein the surfaces of the clamps (52,53) facing each other are formed as clamping surfaces matching the shape of the casing of the supporting body (36).

18. A milling tool according to claim 11, wherein each cutting plate support (4) has a cutout (41) extending from its front side to its rear contact surface (40), and said channel-like recess (37) in the supporting body (36) is formed as a forwardly opened section having a tapped hole (42) extending from the supporting surface (39) and aligned with the cutout (41) in the cutting plate support (4), the diameter of the tapped hole (42) being smaller than the inner width of the cutout (41), further comprising a cup screw (43) for mounting the cutting plate support (4) to the supporting body (36), said cup screw being inserted through the cutout (41) in the support (4) and threaded into the tapped hole (42) of the supporting body.

19. A milling tool according to claim 18, further comprising a disc spring (44) disposed between a side of the head of the cup screw (43) facing the cutting plate support and the outer edge of the cutout (41).

20. A milling tool according to claim 18, further comprising a third bore (54) with inner threads (55) defined in the bottom of the cutting plate support (4), said third bore extending from the outward radially located surface of the support (4) up to its inside radial surface and being disposed essentially perpendicular to the axis of the cutout (41) and being spaced laterally from the cutout (41); and a third exteriorly-drivable set screw (56) threaded into said third bore (54), wherein the inner end of the third screw (56) can be brought into engagement with the inner wall of the first blind hole (32).

* * * * *